United States Patent
Gao et al.

(10) Patent No.: US 11,652,586 B2
(45) Date of Patent: May 16, 2023

(54) METHODS AND APPARATUSES FOR REFERENCE SIGNAL TRANSMISSION

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/608,637

(22) PCT Filed: Apr. 27, 2017

(86) PCT No.: PCT/CN2017/082186
§ 371 (c)(1),
(2) Date: Oct. 25, 2019

(87) PCT Pub. No.: WO2018/195853
PCT Pub. Date: Nov. 1, 2018

(65) Prior Publication Data
US 2020/0052848 A1   Feb. 13, 2020

(51) Int. Cl.
 *H04L 5/00* (2006.01)
 *H04W 72/08* (2009.01)
 *H04W 72/044* (2023.01)

(52) U.S. Cl.
CPC .......... *H04L 5/0048* (2013.01); *H04L 5/0007* (2013.01); *H04W 72/046* (2013.01); *H04W 72/085* (2013.01)

(58) Field of Classification Search
CPC .. H04L 5/0048; H04L 5/0007; H04W 72/046; H04W 72/085
See application file for complete search history.

(56) References Cited

U.S. PATENT DOCUMENTS

2013/0322280 A1   12/2013   Pi
2014/0105189 A1   4/2014   Papasakellariou et al.
(Continued)

FOREIGN PATENT DOCUMENTS

| CN | 106455094 A | 2/2017 |
| EP | 2 866 366 A1 | 4/2015 |

(Continued)

OTHER PUBLICATIONS

Office Action dated Mar. 2, 2021 in Japanese Application No. 2019-558373.

(Continued)

*Primary Examiner* — Donald L Mills
(74) *Attorney, Agent, or Firm* — Sughrue Mion, PLLC

(57) ABSTRACT

Embodiments of the present disclosure relate to methods and devices for reference signal (RS) transmission. In example embodiments, a method implemented in a network device is provided. According to the method, a first set of RS resources are determined for RS transmission by the network device. The first set of RS resources are associated with a first number of RS ports to be used for RS transmission and correspond to a first set of resource elements (REs) interpolated with unused REs in frequency domain. A first RS configuration for RS transmission is generated based on the first set of RS resources. Information on the first RS configuration is transmitted to a terminal device served by the network device.

19 Claims, 12 Drawing Sheets

(56) References Cited

U.S. PATENT DOCUMENTS

| | | | |
|---|---|---|---|
| 2015/0009951 A1 | 1/2015 | Josiam et al. | |
| 2015/0029966 A1 | 1/2015 | Park et al. | |
| 2015/0124753 A1 | 5/2015 | Kim et al. | |
| 2016/0212643 A1* | 7/2016 | Park | H04L 5/0048 |
| 2018/0287682 A1 | 10/2018 | Kwak et al. | |
| 2018/0287757 A1* | 10/2018 | Onggosanusi | H04L 5/0048 |
| 2019/0268088 A1* | 8/2019 | Grant | H04L 5/0051 |
| 2019/0273549 A1* | 9/2019 | Park | H04W 24/10 |
| 2019/0327717 A1 | 10/2019 | Li et al. | |
| 2019/0349124 A1* | 11/2019 | Tang | H04L 5/0082 |
| 2019/0373592 A1 | 12/2019 | Ji et al. | |
| 2019/0379501 A1* | 12/2019 | Park | H04B 7/0628 |
| 2022/0069867 A1* | 3/2022 | Wang | H04B 7/024 |

FOREIGN PATENT DOCUMENTS

| | | |
|---|---|---|
| JP | 2015-513237 A | 4/2015 |
| WO | 2010/106923 A8 | 9/2010 |
| WO | 2014/019517 A1 | 2/2014 |
| WO | 2015/174328 | 11/2015 |

OTHER PUBLICATIONS

3GPP TS 36.331 V14.2.2, 3rd Generation Partnership Project; Technical Specification Group Radio Access Network; Evolved Universal Terrestrial Radio Access (E-UTRA); Radio Resource Control (RRC) Protocol specification (Release 14), Apr. 2017 (721 pages total).

3GPP TS 36.213 V13.5.0, 3rd Generation Partnership Project; Technical Specification Group Radio Access Network; Evolved Universal Terrestrial Radio Access (E-UTRA); Physical layer procedures (Release 13), Mar. 2017 (386 pages total).

3GPP TS 36.211 V13.5.0, 3rd Generation Partnership Project; Technical Specification Group Radio Access Network; Evolved Universal Terrestrial Radio Access (E-UTRA); Physical channels and modulation (Release 13), Mar. 2017 (172 pages total).

Nokia et al., "Non-codebook based UL-MIMO transmission", 3GPP TSG RAN WG1#88 bis, R1-1705980, Spokane, WA, USA, Apr. 3-7, 2017 (4 pages total).

ZTE et al., "UL beam management", 3GPP TSG RAN WG1 Meeting #88bis, R1-1704399, Spokane, USA Apr. 3-7, 2017 (4 pages total).

Ericsson, "On QCL for UL RS", 3GPP TSG-RAN WG1 #88 R1-1702693, Athens, Greece, Feb. 13-17, 2017 (3 pages total).

International Search Report for PCT/CN2017/082186 dated Jan. 17, 2018 [PCT/ISA/210].

Japanese Office Communication for JP Application No. 2019-558373 dated Apr. 12, 2022 with English Translation.

Japanese Office Communication for JP Application No. 2022-077922 dated Mar. 28, 2023 with English Translation.

Huawei, HiSilicon, "UL beam management" [online], 3GPP TSG RAN WG1 #88b R1-1704231, Apr. 7, 2017.

Sony, "Views on multiple SRS resource setting for NR" [online], 3GPP TSG RAN WG1 #88 R1-1703135, Feb. 17, 2017.

* cited by examiner

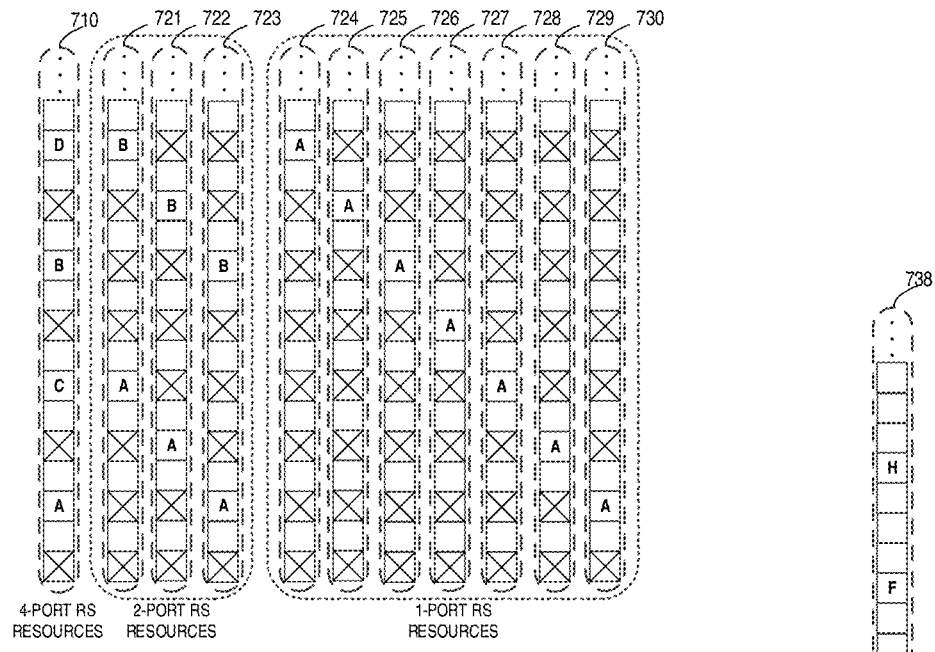
Fig. 7A
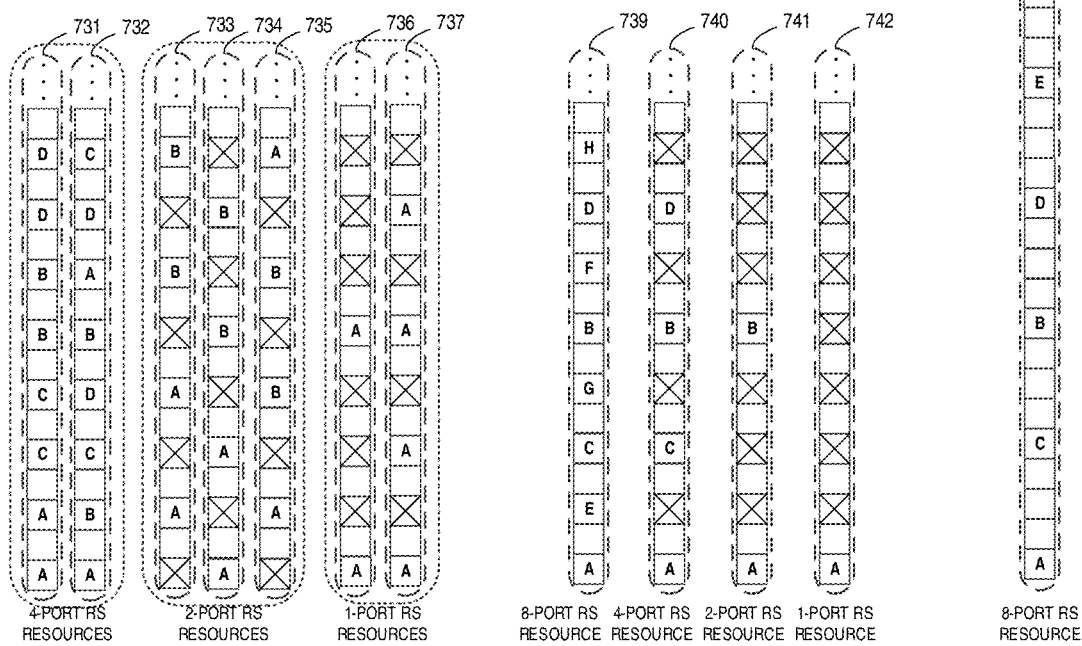
Fig. 7B
Fig. 7D
Fig. 7C

| RS CONFIGURATION | RPF INDICATION |
|---|---|
| CONFIGURATION L | ONE OR MORE VALUES FROM {K1, K2, ⋯, Kn} |

METHODS AND APPARATUSES FOR REFERENCE SIGNAL TRANSMISSION

CROSS REFERENCE TO RELATED APPLICATIONS

This application is a National Stage of International Application No. PCT/CN2017/082186 filed Apr. 27, 2017.

TECHNICAL FIELD

Embodiments of the present disclosure generally relate to the field of telecommunication, and in particular, to methods and apparatuses for reference signal (RS) transmission.

BACKGROUND

With the development of communication technologies, multiple types of services or traffic have been proposed, for example, enhanced mobile broadband (eMBB) generally requiring high data rate, massive machine type communication (mMTC) typically requiring long battery lifetime, and ultra-reliable and low latency communication (URLLC). Meanwhile, multi-antenna schemes, such as beam management, reference signal transmission, and so on, are studied for new radio access. Particularly, it has been agreed in 3GPP specification works that a Channel State Information-Reference Signal (CSI-RS) can support beam sweeping within an Orthogonal Frequency Division Multiplexing (OFDM) symbol.

The CSI-RS should support the transmission (Tx) and reception (Rx) beam sweeping, which could help a terminal device to find out a good Tx-Rx beam pair. To acquire the best Tx-Rx beam pair, given that there are $N_t$ Tx beams and $N_r$ Rx beams, the CSI-RS may need to provide $N_t \times N_r$ repetitions totally. If each repetition takes one symbol, totally $N_t \times N_r$ symbols may be needed for CSI-RS transmission. The number of antennas at a specific Tx/Rx point (such as, a NodeB in new radio access) and the terminal device may be large, which means the number of beams to be swept would be large. In this case, some overhead and latency reduction schemes for CSI-RS transmission need to be considered.

SUMMARY

In general, example embodiments of the present disclosure provide methods and apparatuses for RS transmission.

In a first aspect, there is provided a method implemented in a network device. According to the method, a first set of RS resources are determined for RS transmission by the network device. The first set of RS resources are associated with a first number of RS ports to be used for RS transmission and correspond to a first set of resource elements (REs) interpolated with unused REs in frequency domain. A first RS configuration for RS transmission is generated based on the first set of RS resources. Information on the first RS configuration is transmitted to a terminal device served by the network device.

In a second aspect, there is provided a method implemented in a terminal device. According to the method, information on a first RS configuration for RS transmission by a network device is received from the network device. The first RS configuration is determined based on a first set of RS resources for RS transmission. The first set of RS resources are associated with a first number of RS ports to be used for RS transmission and correspond to a first set of REs interpolated with at least one unused RE in frequency domain. At least one RS sequence is detected based on the first RS configuration.

In a third aspect, there is provided a network device. The network device comprises a processor and a memory coupled to the processor. The memory stores instructions that when executed by the processor, cause the network device to performs actions. The actions comprise: determining a first set of RS resources for RS transmission by the network device, the first set of RS resources being associated with a first number of RS ports to be used for RS transmission and corresponding to a first set of REs interpolated with unused REs in frequency domain; generating, based on the first set of RS resources, a first RS configuration for RS transmission; and transmitting to a terminal device served by the network device information on the first RS configuration.

In a fourth aspect, there is provided a terminal device. The terminal device comprises a processor and a memory coupled to the processor. The memory stores instructions that when executed by the processor, cause the network device to performs actions. The actions comprise: receiving, from a network device, information on a first reference signal (RS) configuration for RS transmission by the network device, the first RS configuration being determined based on a first set of RS resources for RS transmission, the first set of RS resources being associated with a first number of RS ports to be used for RS transmission and corresponding to a first set of resource elements (REs) interpolated with at least one unused RE in frequency domain; and detecting, based on the first RS configuration, at least one RS sequence.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIGS. 7A-7D show examples of configuring the second set of RS resources according to some embodiments of the present disclosure;

Throughout the drawings, the same or similar reference numerals represent the same or similar element.

DETAILED DESCRIPTION

Figure 1:
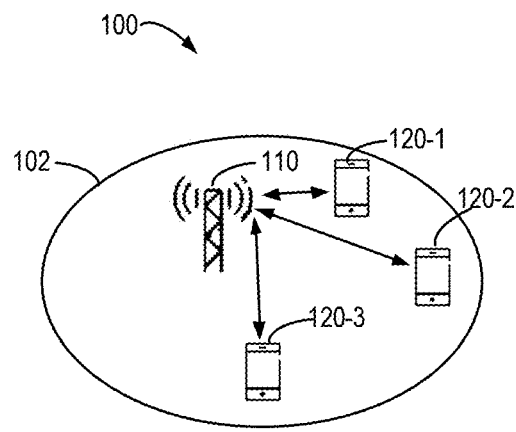
FIG. 1 is a block diagram of a communication environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB) a Remote Radio Unit (RRU), a radio head (RH), a remote radio head (RRH), a low power node such as a femto node, a pico node, and the like. For the purpose of discussion, in the following, some embodiments will be described with reference to gNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UE as examples of the terminal device.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "at least in part based on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Communication discussed in the present disclosure may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

FIG. 1 shows an example communication network 100 in which embodiments of the present disclosure can be implemented. The network 100 includes a network device 110 and three terminal devices 120-1 and 120-3 (collectively referred to as terminal devices 120 or individually referred to as terminal device 120) served by the network device 110. The coverage of the network device 110 is also called as a cell 102. It is to be understood that the number of base stations and terminal devices is only for the purpose of illustration without suggesting any limitations. The network 100 may include any suitable number of base stations and the terminal devices adapted for implementing embodiments of the present disclosure. Although not shown, it would be appreciated that there may be one or more neighboring cells adjacent to the cell 102 where one or more corresponding network devices provides service for a number of terminal device located therein.

The network device 110 may communicate with the terminal devices 120. The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In addition to normal data communications, the network device 110 may send a RS in a broadcast, multi-cast, and/or unicast manners to one or more of the terminal devices 120 in a downlink. Similarly, one or more of the terminal devices 120 may transmit RSs to the network device 110 in an uplink. As used herein, a "downlink" refers to a link from a network device to a terminal device, while an "uplink" refers to a link from the terminal device to the network device. For the purpose of discussion without suggesting any limitations, in the following description, some embodiments will be described with reference to the downlink RS transmission.

For example, in the case of downlink RS transmission, the RS may be used by the terminal devices 120 for beam sweeping, channel estimation, demodulation, and other operations for communication. Generally speaking, a RS is a signal sequence (also referred to as "RS sequence") that is known by both the network device 110 and the terminal devices 120. For example, a RS sequence may be generated and transmitted by the network device 110 based on a certain rule and the terminal device 120 may deduce the RS sequence based on the same rule. Examples of the RS may include but are not limited to downlink or uplink Demodulation Reference Signal (DMRS), Channel State Information-Reference Signal (CSI-RS), Sounding Reference Signal (SRS), Phase Tracking Reference Signal (PTRS) and so on. For the purpose of discussion without suggesting any limitations, in the following description, some embodiments will be described with reference to CSI-RS as examples of the RS.

In transmission of downlink and uplink RSs, the network device 110 may assign corresponding resources (also referred to as "RS resources") for the transmission and/or specify which RS sequence is to be transmitted. In some scenarios, both the network device 110 and the terminal device 120 are equipped with multiple antenna ports (or antenna elements) and can transmit specified RS sequences with the antenna ports (antenna elements). A set of RS resources associated with a number of RS ports are also specified. A RS port may be referred to as a specific mapping of part or all of a RS sequence to one or more resource elements of a resource region allocated for RS transmission in time, frequency, and/or code domains.

As described above, a CSI-RS should support the Tx and Rx beam sweeping within an OFDM symbol to enable the terminal device to find out the best Tx-Rx beam pair. To acquire the best Tx-Rx beam pair, given that there are $N_t$ Tx beams and $N_r$ Rx beams, the CSI-RS may need to provide $N_t \times N_r$ repetitions totally. If each repetition takes one symbol, totally $N_t \times N_r$ symbols may be needed for CSI-RS transmission. With the increasing of the number of antennas at the network device and the terminal device, the number of beams to be swept would become large. This may result in significant overhead and latency for the CSI-RS transmission.

In order to solve the problems above and one or more of other potential problems, a solution for RS transmission is provided in accordance with example embodiments of the present disclosure. With the solution, a nested structure of RS resources based on Interleaved Frequency Division Multiple Access (IFDMA) techniques can be provided. This nested structure of RS resources can support multiple repeated signals within one symbol in time domain, such that the terminal device can detect multiple beams within one symbol. Moreover, with the solution, multiple RS sequences can be mapped to different or same RS resources, such that the terminal device can detect the multiple RS sequences at the same time. Therefore, the solution in accordance with embodiments of the present disclosure can greatly reduce the overhead and latency for RS transmission.

Figure 2:
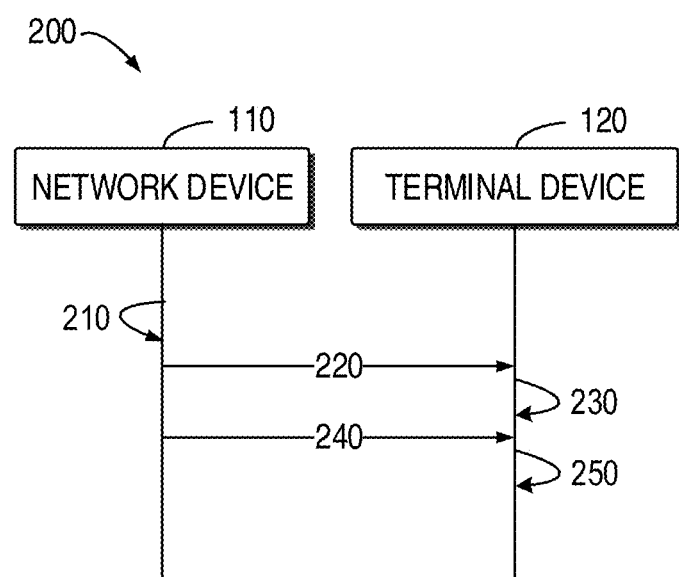
FIG. 2 is a flowchart illustrating a process for RS transmission according to some embodiments of the present disclosure.

Principle and implementations of the present disclosure will be described in detail below with reference to FIGS. 2-14, in which FIG. 2 shows a general process 200 for RS transmission according to some embodiments of the present disclosure. For the purpose of discussion, the process 200 will be described with reference to FIG. 1. The process 200 may involve the network device 110 and one or more terminal devices 120 served by the network device 110.

The network device 110 may configure (210) some information for RS transmission. The information configured by the network device 110 may include configuration of at least one of the following: a number of RS ports, RS resources, a transmission pattern, a density, at least one RS sequence, a repetition factor, transmission power, and etc. The network device may (220) indicate the information to the terminal device 120 by transmitting a RS configuration. The terminal device 120 may receive (230), from the network device 110, the information configured for RS transmission. The network device 110 may transmit (240) the RS to the terminal device 120 based on the RS configuration. The terminal device 120 may receive (250) the transmitted RS based on the RS configuration.

Figure 3:
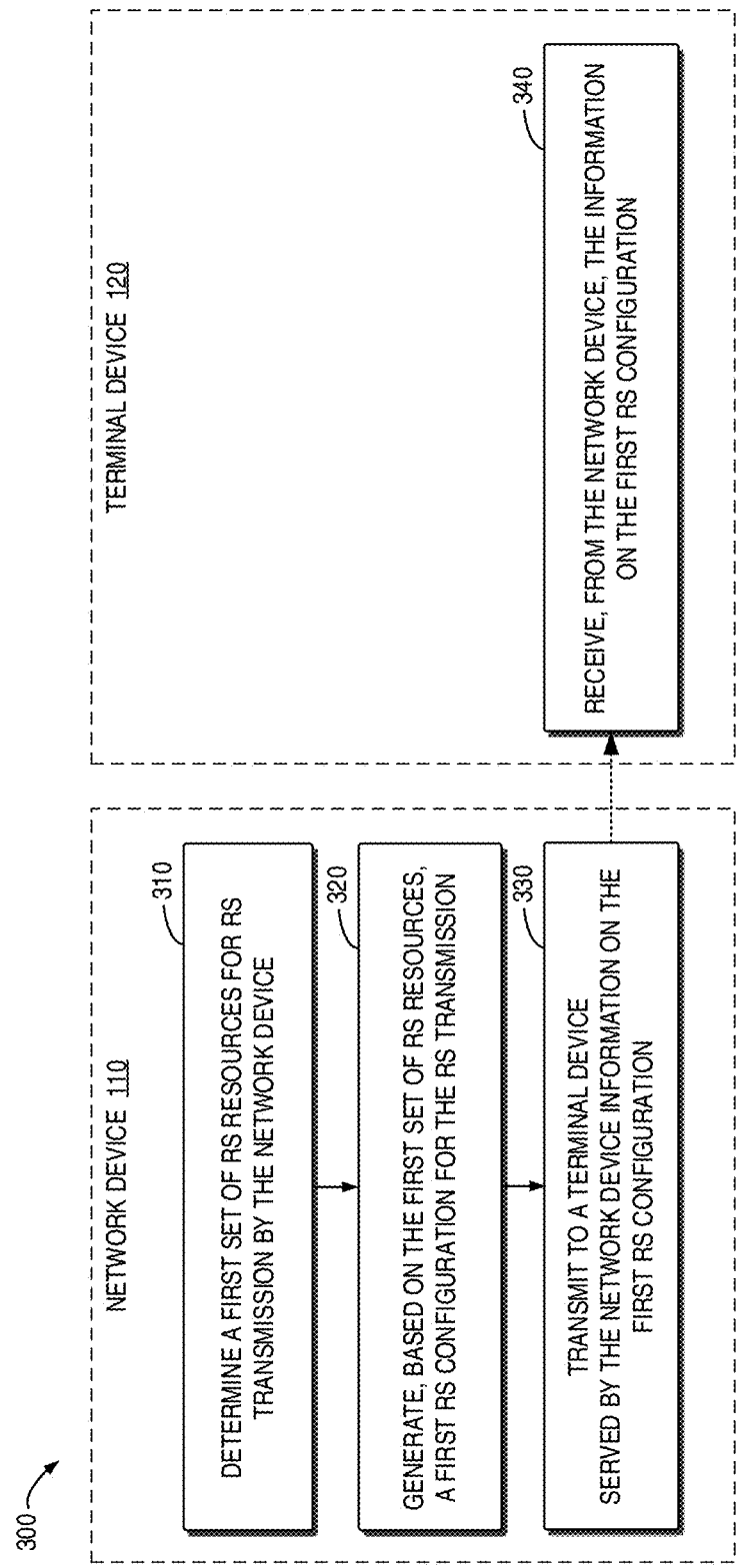
FIG. 3 is a flowchart of an example method in accordance with some embodiments of the present disclosure.

FIG. 3 shows a flowchart of an example method 300 in accordance with some embodiments of the present disclosure. For the purpose of discussion, the method 300 will be described with reference to FIG. 1. The method 300 may involve the network device 110 and one or more terminal devices 120 served by the network device 110.

In act 310, the network device 110 determines a first set of RS resources for RS transmission by the network device 110. The first set of RS resources may be associated with a first number of RS ports to be used for RS transmission and correspond to a first set of REs in frequency domain. In some embodiments, the first set of RS resources may be selected from a predefined set of RS resources associated with a predetermined number of RS ports. In one embodiment, the first set of RS resources may be configured with the first number of RS ports and a repetition factor.

In one embodiment, the first number may be less than or equal to the predetermined number of RS ports. The predetermined number (represented by N) may be same as the maximum number of RS ports being supported. For example, if the maximum number of RS ports is represented by M, the first number may be configured to be an integer which is not greater than M, such as 1, 2 . . . M. In other embodiments, the predetermined number N may be less than the maximum number of RS ports being supported, for example, N<M. Then, the first number of RS ports associated with the first set of RS resources may be configured to be an integer which is not greater than N, such as 1, 2 . . . N.

In one embodiment, the maximum number of RS ports may be configured to be 8. Then, the first number may be configured to be any of 1, 2, 4 and 8. In other embodiments, the predetermined number may be less than the maximum number of RS ports being supported, for example, 4. Then, the first number of RS ports associated with the first set of RS resources may be configured to be any of 1, 2 and 4.

In one embodiment, the repetition factor may be configured based on the capability of the terminal device 120 (for example, whether multiple beams can be detected within one symbol by the terminal device 120). The repetition factor (RPF) may indicate a density of RS resources in frequency domain. For example, if the RPF equals to K (K>1), it may indicate that K-1 unused REs are interpolated between every two adjacent REs for RS transmission. As known to those skilled in the art, K-1 unused REs interpolated between every two adjacent REs may result in K repeated signals within one symbol in time domain.

In one embodiment, the network device 110 may select, from a predefined set of RS resources associated with the predetermined number of RS ports, the first set of RS resources based on the first number of RS ports and the repetition factor. That is, a subset of the predefined set of RS resources can be configured to be the first set of RS resources.

Figure 4A:
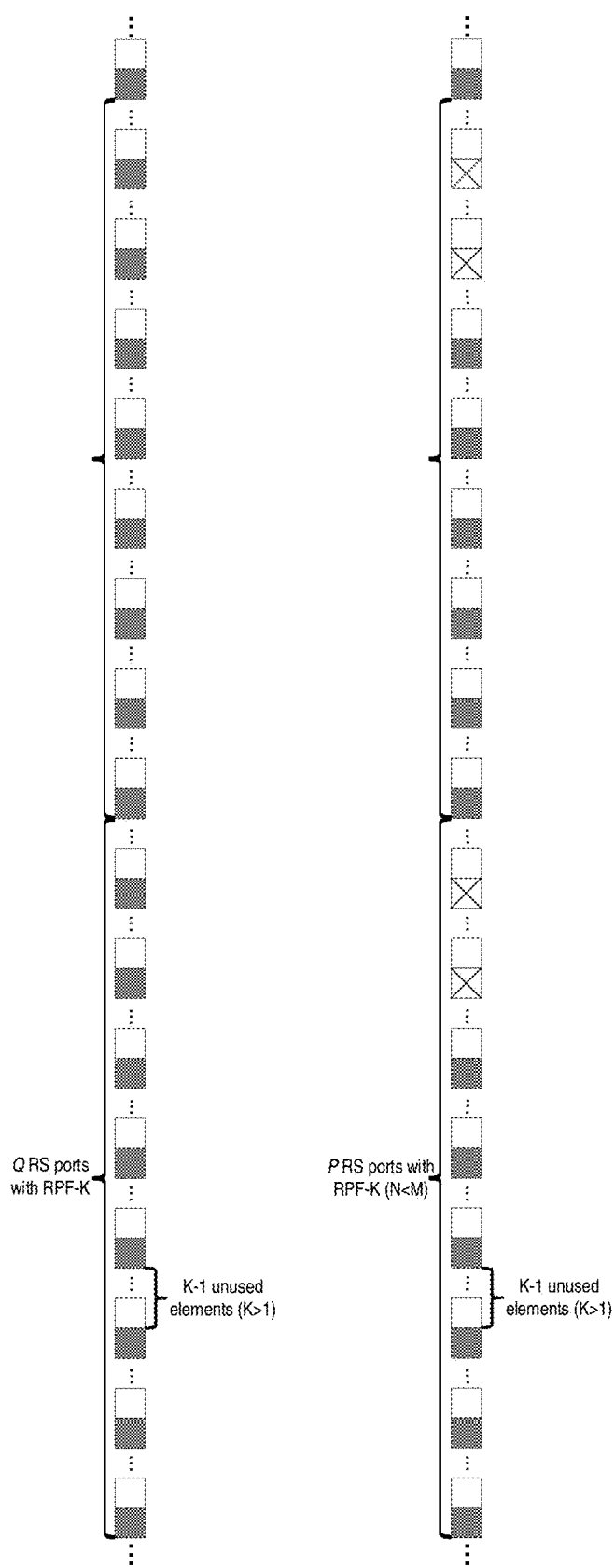
FIG. 4A-4B shows examples of the selection of the first set of RS resources from the predefined set of RS resources according to some embodiments of the present disclosure.

In one embodiment, For example, FIG. 4A shows some examples of the selection of the first set of RS resources from the predefined set of RS resources. FIG. 4A shows different sets of RS resources associated with different RS ports in the case where the RPF equals to K. In FIG. 4A, each element may represent a RE in frequency domain. An occupied element (that is, an element which is filled with shadow) may represent a RE for RS transmission, while an unoccupied element (that is, an element which is blank or filled with a cross) may represent an unused RE.

As shown in FIG. 4A, for example, the predefined set of RS resources is configured with a RPF value of K (also referred as "RPF-K", where K is an integer and K>1). (K-1) unused REs are located between every two adjacent REs for RS transmission. In one embodiment, if the first number of RS ports is Q, a resource set for Q RS ports (also referred to as "a Q-port RS resource" for short) may be selected as the first set of RS resources. In another embodiment, if a Q-port RS resource has been determined, a P-port RS resource (where P is an integer and 1≤P<Q) may be selected from the Q-port RS resource. For example, Q is a multiple of P. In another embodiment, the P-port RS resource may be a subset of the Q-port RS resource, and the unselected resources may be unused for the P RS ports.

Figure 4B:
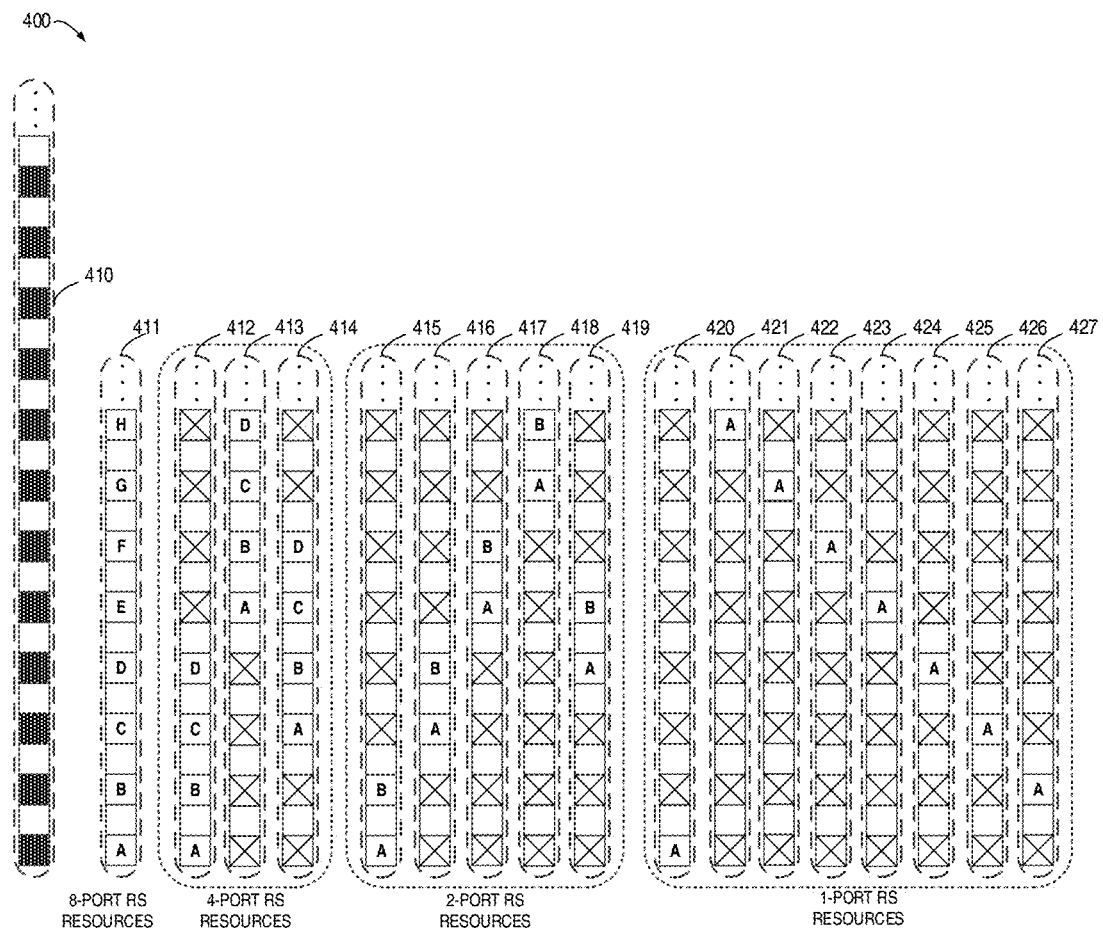

In another embodiment, for example, FIG. 4B shows some examples of the selection of the first set of RS resources from the predefined set of RS resources. FIG. 4B shows different sets of RS resources associated with different RS ports in the case where the RPF equals to 2. In FIG. 4B, each element may represent a RE in frequency domain. An occupied element (that is, an element which is filled with shadow or indexed by an uppercase letter) may represent a RE for RS transmission, while an unoccupied element (that is, an element which is blank or filled with a cross) may represent an unused RE. Specifically, the uppercase letters A-H each may represent an index of a RS port associated with the RE for RS transmission.

As shown in FIG. 4B, for example, the predefined set of RS resources may be represented by a resource set 410 with a RPF value of 2. As shown by the resource set 410, one unused RE is located between every two adjacent REs for RS transmission. If the first number of RS ports is configured to be 8, an 8-port RS resource 411 may be selected as the first set of RS resources. Likewise, if an 8-port RS resource has been determined, a 4-port RS resource may be selected from the 8-port RS resource, such as a subset of the 8-port RS resource. Examples of the 4-port RS resource are shown as 412-414, which are subsets of the 8-port RS resource 411. If an 8-port and/or 4-port RS resource has been determined, a 2-port RS resource may be selected from the 8-port and/or 4-port RS resource, such as a subset of the 8-port and/or 4-port RS resource. Examples of the 2-port RS resource are shown as 415-419, each of which is a subset of the 8-port RS resource 411 or any of the 4-port RS resources 412-414. If a 8-port RS resource, a 4-port RS resource and/or a 2-port RS resource has been determined, a 1-port RS resource may be selected from any of the 8-port RS resource, the 4-port RS resource and/or the 2-port RS resource. For example, the 1-port RS resource may be a subset of any of the 8-port RS resource, the 4-port RS resource and/or the 2-port RS resource. Examples of the 1-port RS resource are shown as 420-427, each of which is a subset of any of the 8-port RS resource 411, the 4-port RS resources 412-414 and the 2-port RS resources 415-419. In this way, a nested structure of RS resources based on IFDMA techniques can be provided.

Figure 5:
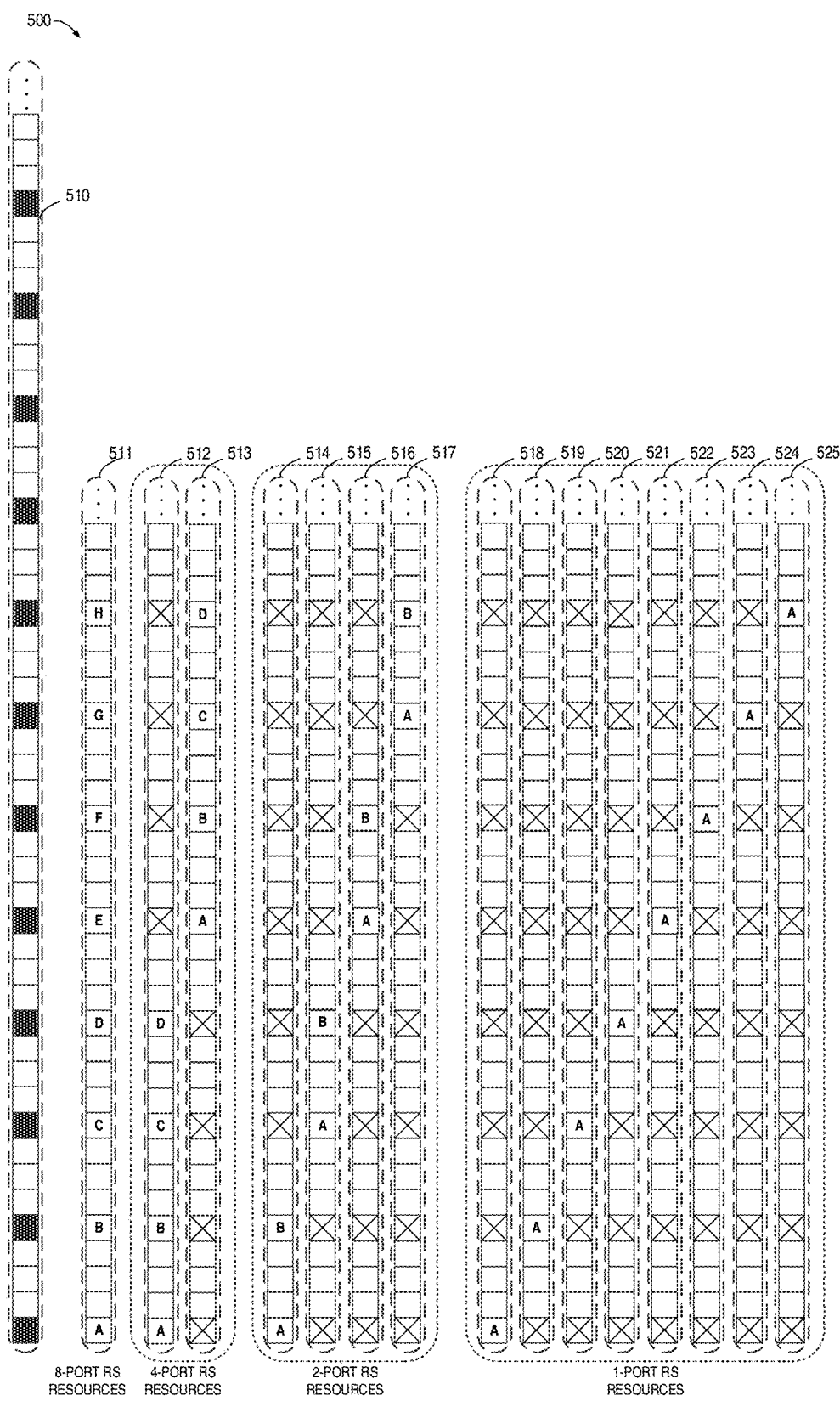
FIG. 5 shows examples of the selection of the first set of RS resources from the predefined set of RS resources according to other embodiments of the present disclosure.

Similarly, FIG. 5 shows some examples of the selection of the first set of RS resources from the predefined set of RS resources according to another embodiment of the present disclosure. FIG. 5 shows different sets of RS resources associated with different RS ports in the case where the repetition factor equals to 4. In FIG. 5, each element may represent a RE in frequency domain. An occupied element (that is, an element which is filled with shadow or indexed by an uppercase letter) may represent a RE for RS transmission, while an unoccupied element (that is, an element which is blank or filled with a cross) may represent an unused RE. Specifically, the uppercase letters A-H each may represent an index of a RS port associated with the RE for RS transmission.

As shown in FIG. 5, for example, the predefined set of RS resources may be represented by a resource set 510 with a RPF value of 4. As shown by the resource set 510, three unused REs are located between every two adjacent REs for RS transmission. If the first number of RS ports is configured to be 8, an 8-port resource 511 may be selected as the first set of RS resources. Likewise, if an 8-port RS resource has been determined, a 4-port RS resource may be selected from the 8-port RS resource, such as a subset of the 8-port RS resource. Examples of the 4-port RS resource are shown as 512-513, which are subsets of the 8-port RS resource 511. If an 8-port and/or 4-port RS resource has been determined, a 2-port RS resource may be selected from the 8-port and/or 4-port RS resource, such as a subset of the 8-port and/or 4-port RS resource. Examples of the 2-port RS resource are shown as 514-517, each of which is a subset of the 8-port RS resource 511 or any of the 4-port RS resources 512-513. If a 8-port RS resource, a 4-port RS resource and/or a 2-port RS resource has been determined, a 1-port RS resource may be selected from any of the 8-port RS resource, the 4-port RS resource and/or the 2-port RS resource. For example, the 1-port RS resource may be a subset of any of the 8-port RS resource, the 4-port RS resource and/or the 2-port RS resource. Examples of the 1-port RS resource are shown as 518-525, each of which is a subset of any of the 8-port RS resource 511, the 4-port RS resources 512-513 and the 2-port RS resources 514-517.

In one embodiment, the RS ports with different indices may be associated with beams. For example one beam associated with one RS port with an index A may be different from another beam associated with another RS port with an index B. In another embodiment, the RS ports may not be multiplexed with orthogonal cover code (OCC).

Referring back to FIG. 3, the method 300 exceeds to act 320, where the terminal device 110 generates, based on the first set of RS resources, a RS configuration (also referred to as "first RS configuration" in the following description) for RS transmission. As used herein, a RS configuration is used to specify one or more aspects of transmission of a RS, for example, a set of RS resources to be used for the transmission, and/or at least one RS sequence to be transmitted. In some embodiments, the first RS configuration may specify the first set of RS resources to be used for RS transmission.

In act 330, the network device 110 transmits to the terminal device 120 information on the first RS configuration. The information may indicate to the terminal device 120 one or more aspects of the RS transmission as specified in the first RS configuration. For example, depending on the first RS configuration, the information may indicate to the terminal device 120 that the first set of RS resources are to be used in the RS transmission.

In act 340, the terminal device 120 receives, from the network device 110, the information on the first RS configuration. The terminal device 120 may determine from the first RS configuration how the RS transmission would be performed. For example, the terminal device 120 may be configured with the first set of RS resources to be used for RS transmission. The terminal device 120 may be configured with the first set of RS resources, which correspond to the first set of REs interpolated with unused REs in frequency domain.

In one embodiment, in addition to the set of RS resources (for example, the first set of RS resources) to be used for RS transmission, the network device 110 may also configure at least one RS sequence to the terminal device 120. The network device 110 may transmit to the terminal device 120 the at least one RS sequence based on the configuration. For example, the network device 110 may transmit the at least one sequence with the configured set of RS resources. Then, at the receiving side, the terminal device 120 may detect the at least one sequence based on the RS configuration.

In some embodiments, a plurality of RS configurations may be configured for different purposes. The plurality of RS configurations may be configured based on different RS resources and/or different RS sequences. For example, different RS resources can be used for transmission of different RSs from different TRPs, different beams and/or different antenna panels.

Figure 6:
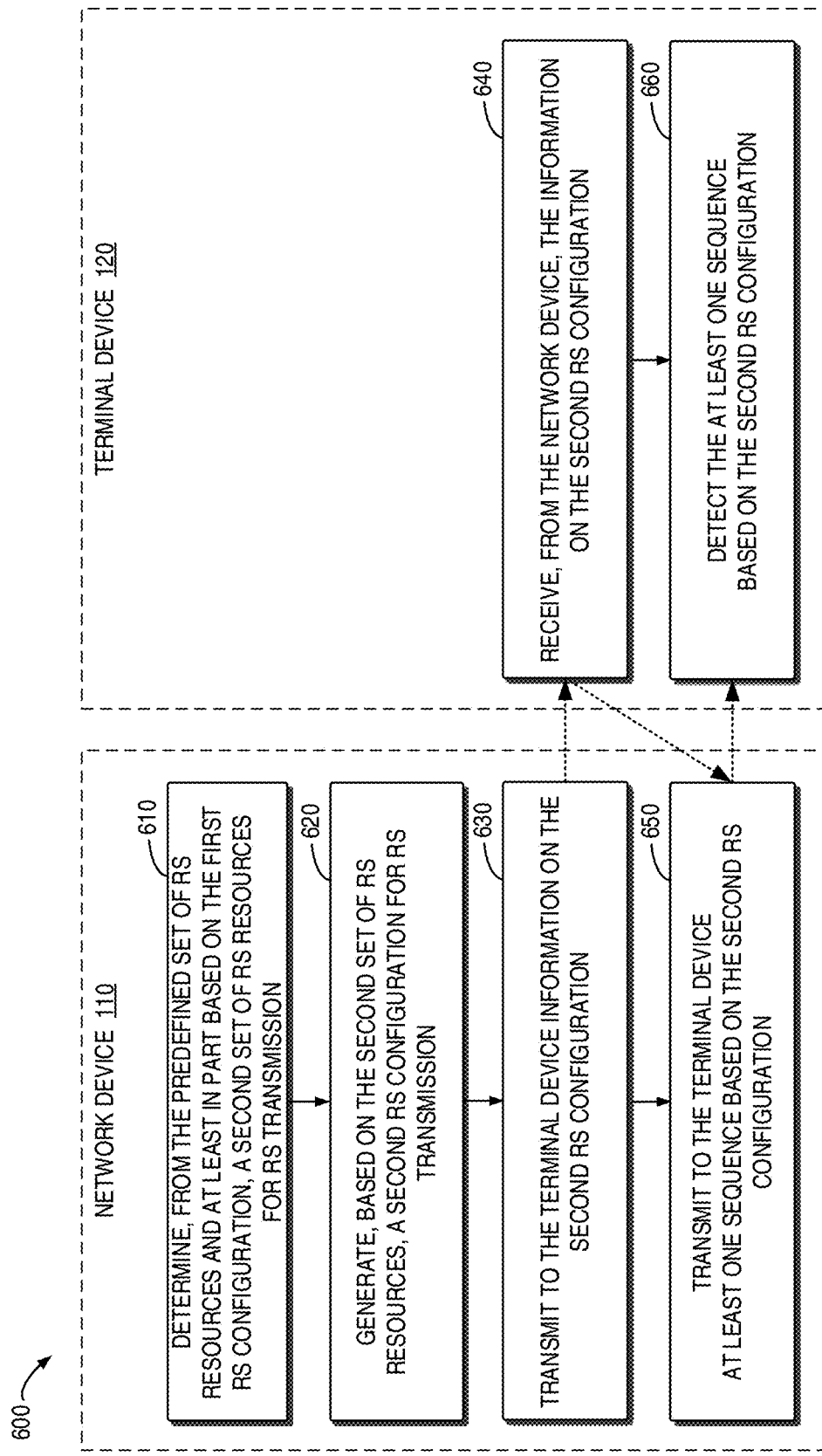
FIG. 6 is a flowchart of an example method in accordance with some embodiments of the present disclosure.

To configure different RS resources for RS transmission, FIG. 6 shows an example method 600 for RS transmission according to some embodiments of the present disclosure. For the purpose of discussion, the method 600 will be described with reference to FIG. 1. The method 600 may involve the network device 110 and one or more terminal devices 120 served by the network device 110. It should be understood that the method 600 may also comprise additional acts (not shown) and/or may omit the illustrated acts. The scope of the present disclosure described herein is not limited in this aspect.

In act 610, the network device 110 determines, from the predefined set of RS resources and at least in part based on the first RS configuration, a second set of RS resources for RS transmission. The second set of RS resources may correspond to a second set of REs in frequency domain.

In some embodiments, the network device 110 may configure the second set of RS resources, such that the second set of RS resources are associated with the same number of RS ports and the same repetition factor as the first set of RS resources. That is, the network device 110 can configure a different subset of the predefined set of RS resources to be the second set of RS resources. Referring back to FIG. 4B, for example, if the first number of RS ports is 4 and the first set of RS resources are configured to be the 4-port RS resource 412, the 4-port RS resource 413 or 414 may be configured as the second set of RS resources. In some embodiment, the first and second set of RS resources can be separate from one another in frequency domain (as shown by the 4-port RS resources 412 and 413). Alternatively, in other embodiments, the first set of RS resources may be at least partially overlapped with the second set of RS resources (as shown by the 4-port RS resources 412 and 414). Similarly, if the first number of RS ports is 2 and the first set of RS resources are configured to be the 2-port RS resource 415, any of the 2-port RS resources 416-419 may be configured as the second set of RS resources.

In some embodiments, the network device may configure the second set of RS resources based on a shift value in frequency and/or time domain. For example, the network device 110 may configure the second set of RS resources by shifting at least part of the first set of REs with the shift value. In one embodiment, as shown in FIG. 4B, if the first set of RS resources is configured to be a 4-port RS resource 412, the second set of RS resources may be configured by shifting at least part of the 4-port RS resource 412, and examples of the second set of RS resources may be shown as 413-414. Alternatively, if the first set of RS resources is configured to be a 2-port RS resource 415, the second set of RS resources may be configured by shifting at least part of the 2-port RS resource 415, and examples of the second set of RS resources may be shown as 416-419. Alternatively, if the first set of RS resources is configured to be a 1-port RS resource 420, the second set of RS resources may be configured by shifting at least part of the 1-port RS resource 420, and examples of the second set of RS resources may be shown as 421-427.

In another embodiment, FIG. 7A and FIG. 7D show examples of configuring the second set of RS resources according to some embodiments of the present disclosure. As shown in FIG. 7D, if the first set of RS resources is configured to be a 4-port RS resource 740, the second set of RS resources may be configured by shifting at least part of the 4-port RS resource 740, and one example of the second set of RS resources may be shown as 710 in FIG. 7A. Alternatively, if the first set of RS resources is configured to be a 2-port RS resource 741 as shown in FIG. 7D, the second set of RS resources may be configured by shifting at least part of the 2-port RS resource 741, and examples of the second set of RS resources may be shown as 721-723 in FIG. 7A. Alternatively, if the first set of RS resources is configured to be a 1-port RS resource 742 as shown in FIG. 7D, the second set of RS resources may be configured by shifting at least part of the 1-port RS resource 742, and examples of the second set of RS resources may be shown as 724-730 in FIG. 7A.

In some embodiments, the network device may configure the second set of RS resources, such that the second set of RS resources are associated with the same number of RS ports as the first set of RS resources while have a higher density than the first set of RS resources. For example, the second set of RS resources may be associated with a smaller repetition factor than the first set of RS resources. In one embodiment, FIG. 7B and FIG. 7D show examples of configuring the second set of RS resources according to some embodiments of the present disclosure. As shown in FIG. 7B, if the first set of RS resources is configured to be the 4-port RS resource 710 or 740, a 4-port RS resource 731 or 732 may be configured to be the second set of RS resources. If the first set of RS resources is configured to be a 2-port RS resource 741 or 722, a 2-port RS resource 734 may be configured to be the second set of RS resources. Alternatively, if the first set of RS resources is configured to be a 2-port RS resource 721 or 723, a 2-port RS resource 733 or 735 may be configured to be the second set of RS resources. Similarly, the examples about a 1-port RS resource are shown by 1-port RS resources 736 and 737.

In some embodiments, the network device may configure the second set of RS resources, such that the second set of RS resources are associated with a different number of RS ports from the first set of RS resources but the same repetition factor as it. For example, the second set of RS resources may be associated with a second number of RS ports, where the second number is greater than the first number. In another example, the second number is a multiple of the first number. In this case, the second set of REs corresponding to the second set of RS resources in frequency domain may include the first set of REs corresponding to the first set of REs with same indexing. In this regard, FIG. 7C shows examples of configuring the second set of RS resources according to some embodiments of the present disclosure. As shown in FIG. 7C, if the first set of RS resources is configured to be a 4-port RS resource 740, the second set of RS resources may be configured to be an 8-port RS resource 738.

In some embodiments, the network device may configure the second set of RS resources, such that the second set of RS resources are associated with a different number of RS ports from the first set of RS resources, and the second set of REs are include in the first set of REs with same indexing.

In one embodiment, FIG. 7D shows examples of configuring the second set of RS resources according to some embodiments of the present disclosure. As shown in FIG. 7D, if the first set of RS resources is configured to be an 8-port RS resource (for example, the 8-port RS resource 739) and the second number of RS ports is 4, the second set of RS resources may be configured for 4 RS ports. The second set of RS resources may be included in the 8-port RS resource, and the indexing for the 4 RS ports in the 4-port resource (that is, the second set of RS resources) may be same as that for the 4 RS ports in the 8-port RS resource. An example of the second set of RS resources for 4 RS ports is shown as 740. Alternatively, if the second number of RS ports is 2, the second set of RS resources may be configured for 2 RS ports, and the second set of RS resources may be included in a 8-port and/or 4-port resource, and the indexing for the 2 RS ports may be same as that for the 2 ports in the 8-port resource 739 and/or the 4-port resource 740. An example of the second set of RS resources for 2 RS ports is shown as 741. Alternatively, if the second number of RS ports is 1, the second set of RS resources may be configured for 1 RS port. The second set of RS resources may be included in a 8-port RS resource, a 4-port RS resource and/or a 2-port RS resource, and the indexing for the 1 RS port may be same as the 1 port in the 8-port RS resource 739, the 4-port RS resource 740 and/or the 2-port resource 741. An example of the second set of RS resources for 1 RS port is shown as 742. It can be seen that the 4-port RS resource 740 is included in the 8-port RS resource 739 with same indexing for the 4 RS ports. The 2-port RS resource 741 is included in the 8-port RS resource 739 and/or the 4-port RS resource 740 with same indexing for the 2 RS ports. The 1-port RS resource 742 is included in the 8-port resource 739, the 4-port RS resource 740, and/or the 2-port RS resource 741 with same indexing for the 1 RS port.

Referring back to FIG. 6, the method 600 exceeds to act 620, where the terminal device 110 generates, based on the second set of RS resources, a RS configuration (also referred to as "second RS configuration" in the following description) for RS transmission. The second RS configuration may specify the second set of RS resources to be used for RS transmission.

In act 630, the network device 110 transmits to the terminal device 120 information on the second RS configuration. The information may indicate to the terminal device 120 one or more aspects of the RS transmission as specified in the second RS configuration. For example, depending on the configured second RS configuration, the information may indicate to the terminal device 120 that the second set of RS resources are to be used in the RS transmission.

Figures 8A, 8B:
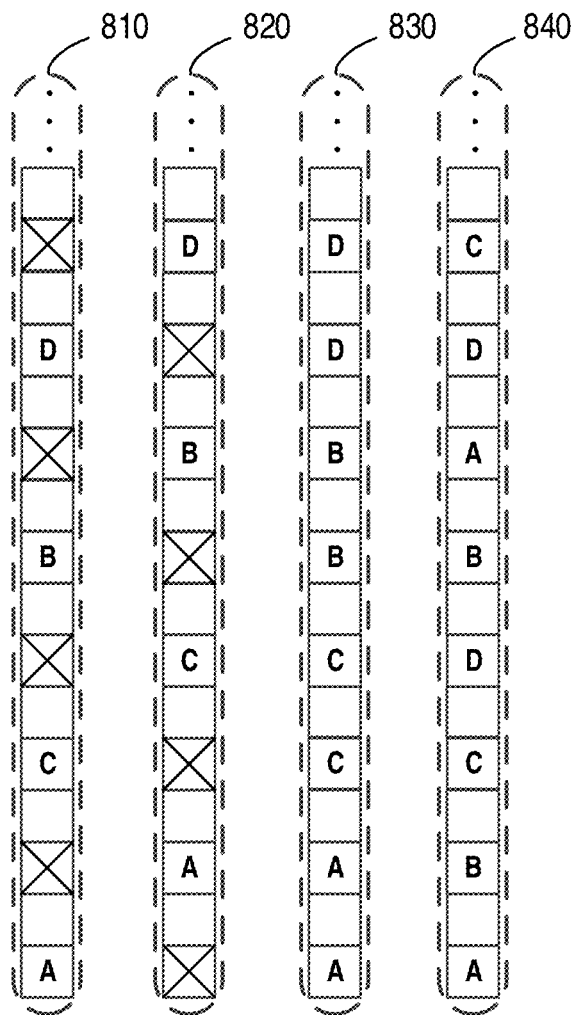
FIG. 8A shows examples of the RPF indication in the RS configuration according to some embodiments of the present disclosure.
FIG. 8B shows examples of the information on the second RS configuration according to some embodiments of the present disclosure.

In some embodiments, the information on the RS configuration may include an indication of a corresponding RPF. FIG. 8A shows examples of the RPF indication in the RS configuration according to some embodiments of the present disclosure. For example, the network device may configure a set of RPF values for one RS configuration, as shown in FIG. 8A. The RS configuration may also include configuration of at least one of the following: time and/or frequency resources, a transmission pattern, a number of RS ports, at least one RS sequence, and etc. In another embodiment, the RPF configuration for different RS configurations may be different. In another embodiment, for some RS configurations, only one RPF value may be supported, and thus for the RS configuration, the indication of the corresponding RPF may not be needed.

In another embodiment, the information on the RS configuration may include an indication of a corresponding RPF value. For example, the network device may have already configured the first set of RS resources for RS transmission via the first RS configuration. In this case, the network device may further configure the second set of RS resources for RS transmission by indicating a different RPF to be applied to the first set of RS resources. For example, the information on the second RS configuration may include an optional field to indicate the corresponding RPF. In this regard, FIG. 8B shows examples of the information on the second RS configuration according to some embodiments of the present disclosure. As shown in FIG. 8B, if the first configuration corresponds to a 4-port RS resource 810 (that is the first set of RS resources) which has already been configured to the terminal device 120, the network device 110 may indicate to the terminal device 120 a RPF value of 2 or 4 in the information on the second configuration. That is, the 4-port RS resource 810 can support different RPF values for different RS configurations. However, the other three RS configurations 820-840 only support one RPF value which is 2. In this case, information on the other three RS configurations 820-840 may have no field for indicating the RPF value.

Referring back to FIG. 6, the method 600 exceeds to act 640, where the terminal device 120 receives, from the network device 110, the information on the second RS configuration. The terminal device 120 may determine from the second RS configuration how the RS transmission would be performed. For example, the terminal device 120 may be configured with the second set of RS resources to be used for RS transmission. The terminal device 120 may be configured with the second set of RS resources, which correspond to the second set of REs interpolated with unused REs in frequency domain.

In act 650, the network device 110 may transmit to the terminal device 120 at least one RS sequence based on the second configuration. For example, the network device 110 may transmit the at least one sequence with the configured second set of RS resources. Then, at the receiving side of the RS transmission, in act 660, the terminal device 120 may detect the at least sequence based on the second RS configuration.

Figure 9:
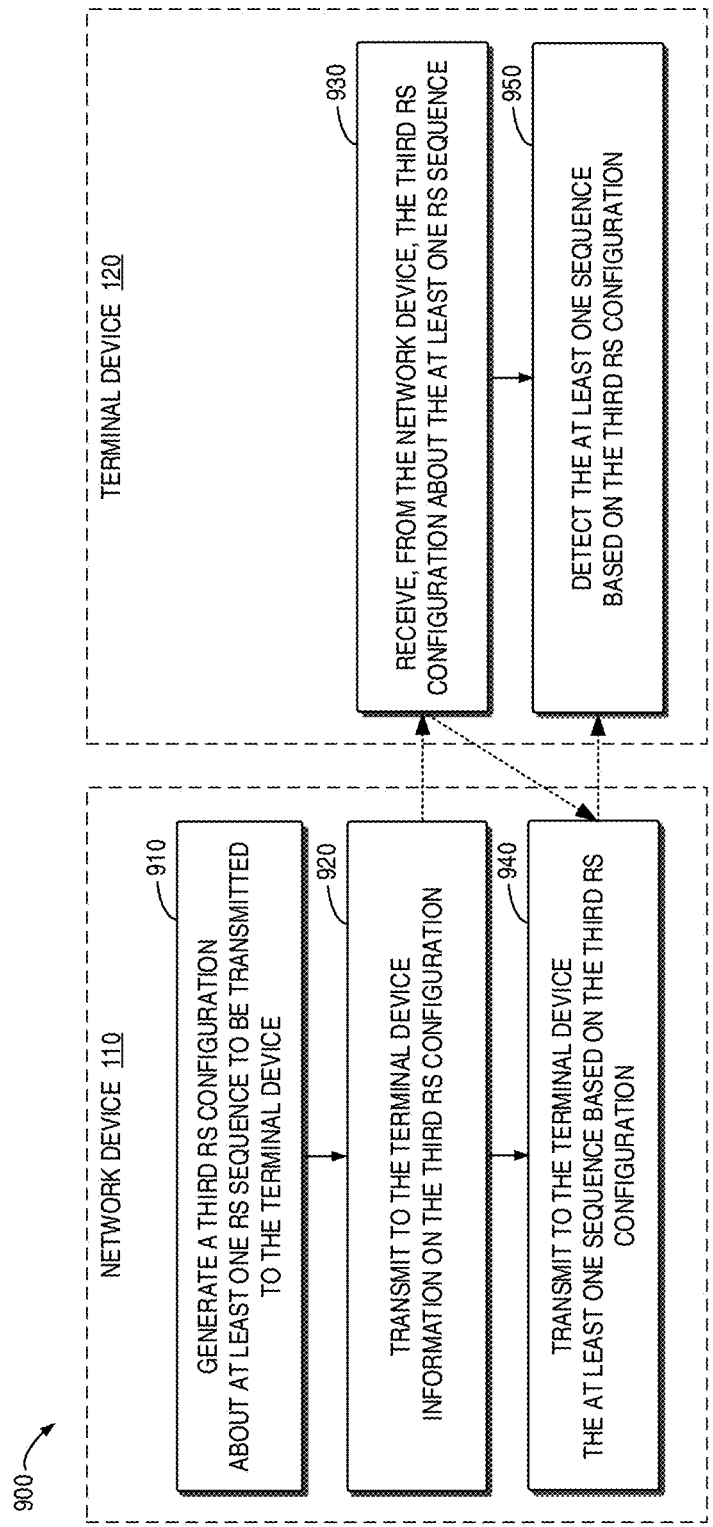
FIG. 9 is a flowchart of an example method in accordance with some embodiments of the present disclosure.

To support detection of different RS sequences at the same time, FIG. 9 shows a process 900 for RS transmission according to some embodiments of the present disclosure. For the purpose of discussion, the process 900 will be described with reference to FIG. 1. The process 900 may involve the network device 110 and one or more terminal devices 120 served by the network device 110. It should be understood that the process 900 may also comprise additional acts (not shown) and/or may omit the illustrated acts. The scope of the present disclosure described herein is not limited in this aspect.

In act 910, the network device 110 generates a third RS configuration about at least one RS sequence to be transmitted to the terminal device 120. In some embodiments, examples of the RS sequences may include but not limited to pseudorandom noise (PN) sequences, Zadoff-Chu (ZC) sequences, or the like.

In some embodiments, the third RS configuration about the at least one RS sequence may be dependent from the first or second RS configuration. In other embodiments, the third RS configuration can be included in the first or second RS configuration. That is, the first or second RS configuration may include configurations about both RS resources and RS sequences.

In some embodiments, the third RS configuration may indicate the number of RS sequences in the at least one RS sequence to be transmitted. Alternatively, the third RS configuration may also indicate which RS resources are to be used for transmitting different RS sequences.

Figure 10A:
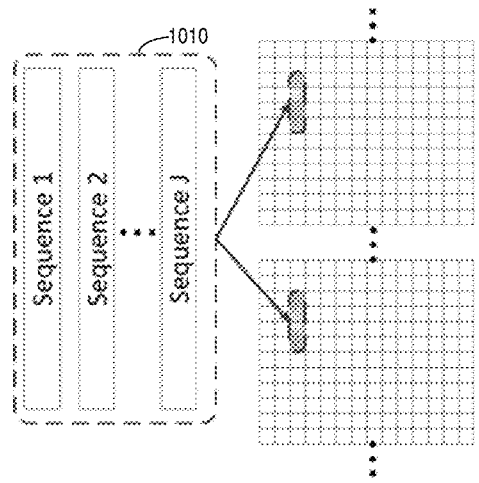
FIGS. 10A-10B show examples of resource mapping of different RS sequences according to some embodiments of the present disclosure.
Figure 10B:
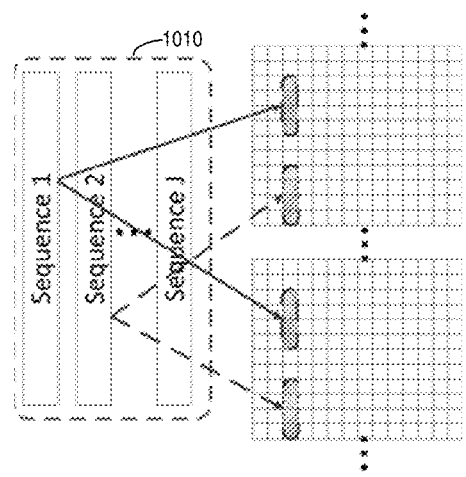

In some embodiments, the third RS configuration may indicate that the different RS sequences are to be transmitted with same RS resources. In other embodiments, for example, the third RS configuration may indicate that the different RS sequences are to be transmitted with different RS resources. FIGS. 10A-10B show examples of resource mapping of different RS sequences according to some embodiments of the present disclosure. In FIG. 10A, different RS sequences 1010 are mapped to same RS resources. In FIG. 10B, the different RS sequences 1010 are mapped to different RS resources.

Figure 11A:
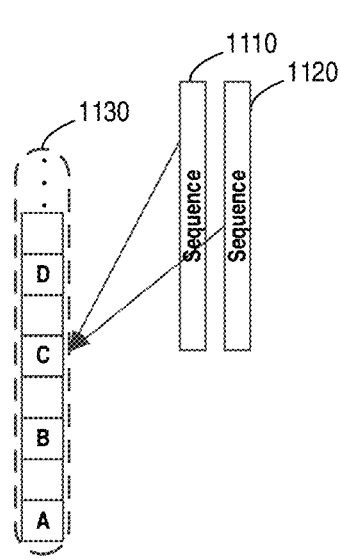
FIGS. 11A-11B show examples of resource mapping of different RS sequences according to some embodiments of the present disclosure.
Figure 11B:
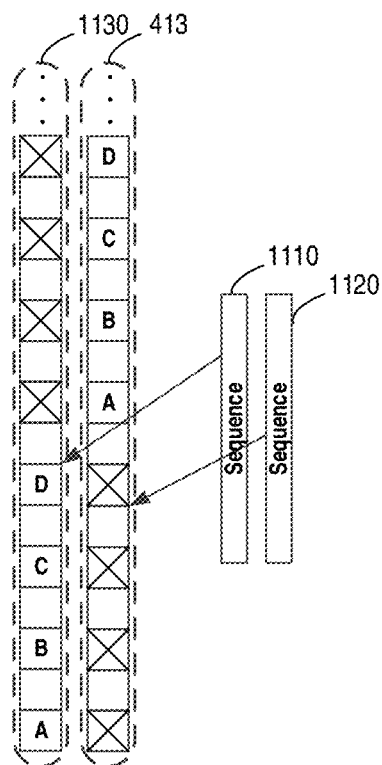

In some embodiments, for example, the at least one RS sequence may include at least first and second RS sequences. The third RS configuration may indicate that the first RS sequence is to be transmitted with the first set of RS resources, while the second RS sequence is to be transmitted with the second set of RS resources. FIGS. 11A-11B show examples of resource mapping of different RS sequences according to some embodiments of the present disclosure. In FIG. 11A, RS sequences 1110 and 1120 are mapped to a 4-port RS resource 1130. In FIG. 11B, the RS sequence 1110 is mapped to the 4-port RS resource 1140, while the RS sequence 1120 is mapped to another 4-port RS resource 1150.

Referring back to FIG. 9, the process 900 exceeds to act 920, where the network device 110 transmits to the terminal device 120 information on the third RS configuration.

In some embodiments, the information on the third RS configuration may be transmitted via high level signaling and/or dynamic signaling. Examples of the high level signaling may include but not limited to signaling on Radio Resource Control (RRC) Layer, or Media Access Control (MAC) layer. Examples of the dynamic signaling may include but not limited to Downlink Control Information (DCI).

In some embodiments, the network device 110 may perform a multi-level configuration for a plurality of RS sequences. For example, the network device 110 may be configured with L (L≥1) RS sequences for the terminal devices 120 via the higher layer signaling. The network device 110 may then configure G (1≤G≤L) RS sequences out of the L RS sequences for some of the terminal devices 120 via the higher layer signaling or the dynamic signaling.

In act 930, the terminal device 120 receives, from the network device 110, the third RS configuration about the at least one RS sequence. The terminal device 120 may be configured with the number of RS sequences to be transmitted. The terminal device 120 may also be configured with which RS resources to be used for transmitting different RS sequences. In some embodiments, the terminal device 120 may be configured with information that the different RS sequences are to be transmitted with same RS resources. In other embodiments, the terminal device 120 may be configured with information that the different RS sequences are to be transmitted with different RS resources. Specifically, in some embodiments, the at least one RS sequence may include at least first and second RS sequences. The terminal device 120 may be configured with information that the first RS sequence is to be transmitted with the first set of RS resources, while the second RS sequence is to be transmitted with the second set of RS resources.

In act 940, the network device 110 may transmit to the terminal device 120 at least one RS sequence based on the third configuration. Then, in act 950, the terminal device 120 may detect the at least one RS sequence based on the third RS configuration.

The terminal device 120 may detect the at least one RS sequence with the RS resources indicated by the third RS configuration. For example, in some embodiment, the third RS configuration may indicate that the at least one RS sequence is transmitted with the first set of RS resources. In this case, the terminal device 120 may detect the at least one RS sequence with the first set of RS resources. In other embodiments, the at least one RS sequence may include at least first and second RS sequences. The third configuration may indicate that the first RS sequence is to be transmitted with the first set of RS resources, while the second RS sequence is to be transmitted with the second set of RS resources. In this case, the terminal device 120 may detect the first RS sequence with the first set of RS resources and detect the second RS sequence with the third set of RS resources.

In view of the above, the proposed solution for RS transmission can provide a nested structure of RS resources based on IFDMA techniques. This nested structure of RS resources can support multiple repeated signals within one symbol in time domain, such that the terminal device can detect multiple beams within one symbol. Moreover, with the solution, multiple RS sequences can be mapped to different or same RS resources, such that the terminal device can detect the multiple RS sequences at the same time. Therefore, the solution in accordance with embodiments of the present disclosure can greatly reduce the overhead and latency for RS transmission.

In addition, the proposed solution may provide considerations about some other aspects of RS transmission.

For example, in some embodiments, the RS resources for beam management may not be used for interference measurement. For example, some RS configurations may be configured for beam management. The RS configurations may indicate some resources for RS transmission, and the resources indicated by the RS configurations may not be configured as the resources for interference measurement.

In some embodiments, the RS resources for beam management may be configured with partial band. For frequencies out of the partial band, other signals (such as Physical Downlink Shared Channel, Physical Downlink Control Channel, Synchronization Signal Block, and etc.) rather than the RS can be transmitted. For the transmission of other signals, a same RPF value as the RS transmission can be applied.

In some embodiments, whether multiple beams can be detected within one symbol may depend on the capability of the terminal device. For example, in one embodiment, the terminal device may have different capabilities to detect the RS. The terminal device may report information on the capability to the network device. In other embodiment, the network device may receive the information on the capability, and the network device may configure the RS with a RPF value K based on the information on the capability. In another embodiment, the terminal device may have different capabilities to detect the RS, and the reported information may be different based on the different capabilities. For example, in one embodiment, the terminal device may have different capabilities to detect the RS, and the terminal device can detect multiple beams within one symbol. In this case, the terminal device may select one or more beams within one symbol and report the selection to the network device.

Figures 12A, 12B:
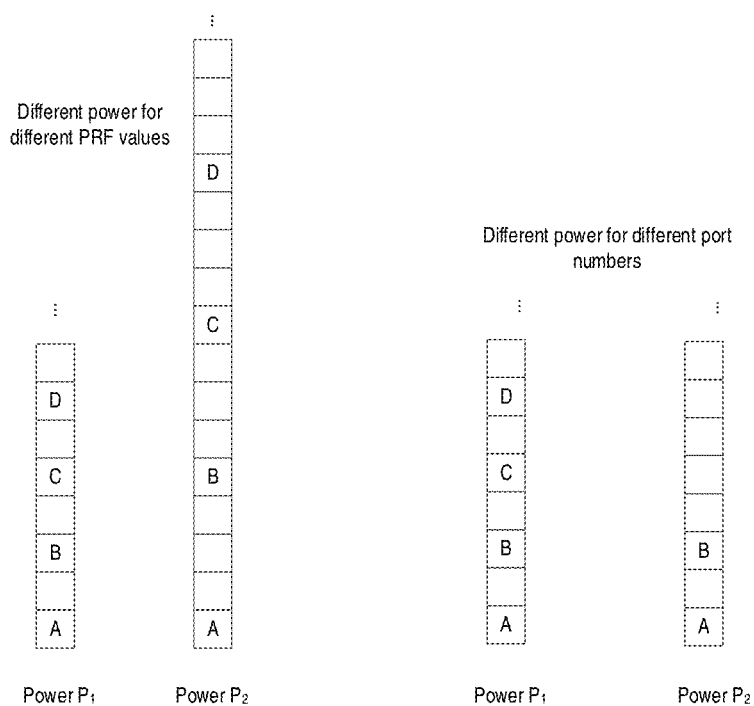
FIG. 12A-12B show examples of different power configurations for RS transmission according to some embodiments of the present disclosure.

In some embodiments, power boosting may be applied to the set of RS resources allocated for RS transmission. The power of RS transmission for beam management can be different from power of other RS transmissions, for example, RS transmission for CSI acquisition. In some embodiments, the power of RS transmission may have different power values, which may be based on the RPF value and/or the number of RS ports. In one embodiment, for different RPF configurations, values of the power may be different, for example as shown in FIG. 12A. In another embodiment, for different number of RS ports, values of the power may be different, for example as shown in FIG. 12B.

In one embodiment, the network device may configure different power parameters to the terminal device, and the different power parameters may be associated with different RPF values and/or different number of RS ports. In another embodiment, the network device may configure information on a reference power to the terminal device. The network may also configure different power offset values relative to the reference power for RS transmissions with different PRF values and/or different number of RS ports. For example, the information on the reference power may be used to indicate the power of RS transmission for reference. For another example, the information on the reference power may be used for RS transmission with a fixed RPF value K and/or a fixed number of RS ports H.

Figure 13:
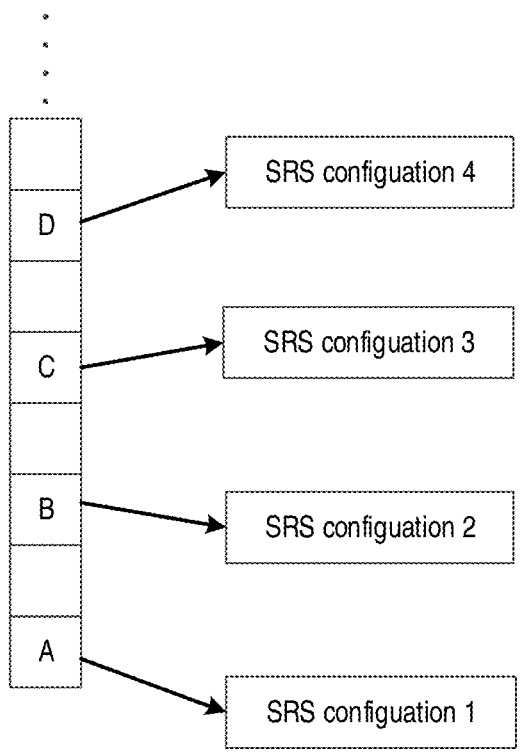
FIG. 13 shows examples of SRS configurations associated with a CSI-RS configuration according to some embodiments of the present disclosure.

In some embodiments, a configuration of SRS transmission may be associated with the RS configuration. For example, at least part of SRS configurations may be mapped to at least part of CSI-RS configurations, and the SRS configurations may include information on at least one of the following: SRS resources, SRS sequences, SRS transmission bands and etc. In addition, the CSI-RS configurations may indicate at least one of CSI-RS resources, CSI-RS port indices and etc. In one embodiment, for example, at least part of SRS resources and/or SRS sequences are mapped to at least part of CSI-RS resources, such as one or more of CSI-RS ports. For example as shown in FIG. 13, different SRS configurations may be associated with different CSI-RS ports. For example, each of the CSI-RS ports may correspond to one beam. For example, once the terminal device selects one beam, the terminal device can transmit a SRS with an associated CSI-RS port.

Figure 14:
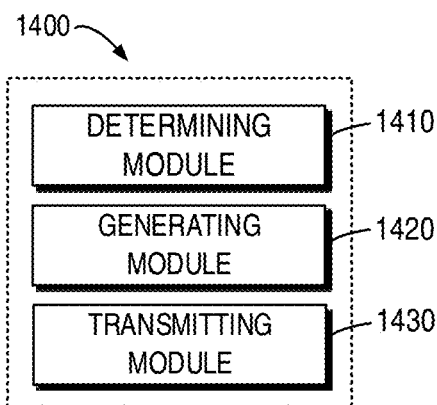
FIG. 14 is a block diagram of a network device in accordance with some embodiments of the present disclosure.

FIG. 14 shows a block diagram of an apparatus 1400 in accordance with some embodiments of the present disclosure. The apparatus 1400 can be considered as an example implementation of the network device 110 as shown in FIG. 1. As shown, the apparatus 1400 includes a determining module 1410 configured to determine a first set of reference signal (RS) resources for RS transmission by the network device, the first set of RS resources being associated with a first number of RS ports to be used for RS transmission and corresponding to a first set of resource elements (REs) interpolated with unused REs in frequency domain. The apparatus 1400 also includes a generating module 1420 configured to generate, based on the first set of RS resources, a first RS configuration for RS transmission. In addition, the apparatus 1400 may also include a transmitting module 1430 configured to transmit to a terminal device served by the network device information on the first RS configuration.

Figure 15:
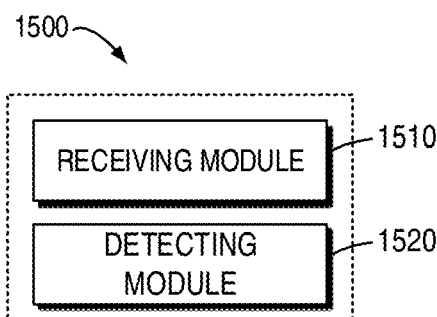
FIG. 15 is a block diagram of a terminal device in accordance with some embodiments of the present disclosure.

FIG. 15 shows a block diagram of an apparatus 1500 in accordance with some embodiments of the present disclosure. The apparatus 1500 can be considered as an example implementation of the terminal device 120 as shown in FIG. 1. As shown, the apparatus 1500 includes a receiving module 1510 configured to receive, from a network device, information on a first reference signal (RS) configuration for RS transmission by the network device, the first RS configuration being determined based on a first set of RS resources for RS transmission, the first set of RS resources being associated with a first number of RS ports to be used for RS transmission and corresponding to a first set of resource elements (REs) interpolated with at least one unused RE in frequency domain. The apparatus 1500 also includes a detecting module 1520 configured to detect, based on the first RS configuration, at least one RS sequence.

For the sake of clarity, FIGS. 14 and/or 15 do not illustrate some optional modules of the apparatuses 1400 and/or 1500. However, it should be understood that various features as described with reference to FIGS. 1-13 are likewise applicable to the apparatuses 1400 and/or 1500. Moreover, respective modules of the apparatuses 1400 and/or 1500 may be hardware modules or software modules. For example, in some embodiments, the apparatuses 1400 and/or 1500 may be implemented partially or completely by software and/or firmware, e.g., implemented as a computer program product embodied on the computer-readable medium. Alternatively, or in addition, the apparatuses 1400 and/or 1500 may be partially or completely implemented based on hardware, e.g., implemented as an integrated circuit (IC), an application-specific integrated circuit (ASIC), a system on chip (SOC), a field programmable gate array (FPGA) and the like. The scope of the present disclosure is not limited in this aspect.

Figure 16:
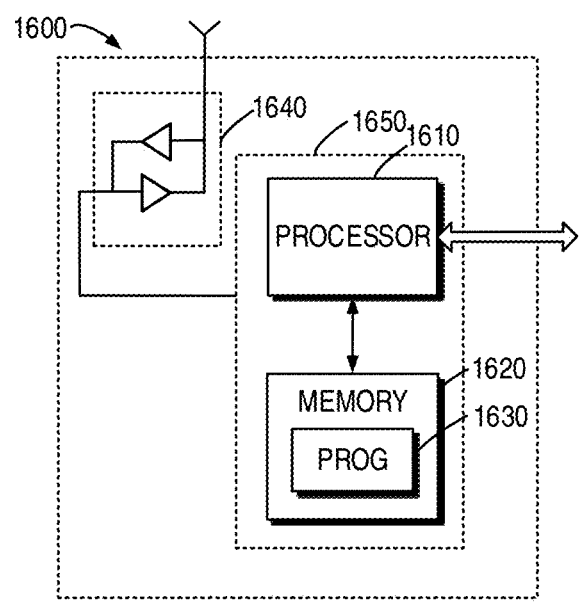
FIG. 16 is a simplified block diagram of a device that is suitable for implementing embodiments of the present disclosure.

FIG. 16 is a simplified block diagram of a device 1600 that is suitable for implementing embodiments of the present disclosure. The device 1600 can be considered as a further example implementation of a network device 110 or a terminal device 120 as shown in FIG. 1. Accordingly, the device 1600 can be implemented at or as at least a part of the network device 110 or the terminal device 120.

As shown, the device 1600 includes a processor 1610, a memory 1620 coupled to the processor 1610, a suitable transmitter (TX) and receiver (RX) 1640 coupled to the processor 1610, and a communication interface coupled to the TX/RX 1640. The memory 1610 stores at least a part of a program 1630. The TX/RX 1640 is for bidirectional communications. The TX/RX 1640 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1630 is assumed to include program instructions that, when executed by the associated processor 1610, enable the device 1600 to operate in accordance with the embodiments of the present disclosure, as discussed herein with reference to FIGS. 1 to 13. The embodiments herein may be implemented by computer software executable by the processor 1610 of the device 1600, or by hardware, or by a combination of software and hardware. The processor 1610 may be configured to implement various embodiments of the present disclosure. Furthermore, a combination of the processor 1610 and memory 1610 may form processing means 1650 adapted to implement various embodiments of the present disclosure.

The memory 1610 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1610 is shown in the device 1600, there may be several physically distinct memory modules in the device 1600. The processor 1610 may be of any type suitable to the local technical network, and may include one or more of general purpose computers, special purpose computers, microprocessors, digital signal processors (DSPs) and processors based on multicore processor architecture, as non-limiting examples. The device 1600 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 1 to 13. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a User Equipment (UE), the method comprising:
   receiving, from a base station, configuration information configuring a first resource for a CSI-RS (Channel State Information Reference Signal),
   wherein,
   the first resource comprises one or more resource elements allocated for the CSI-RS,
   the first resource is within a first partial frequency band, and
   the first partial frequency band is configured within a downlink frequency region where a Physical Downlink Shared Channel (PDSCH) is received;
   receiving, from the base station, the CSI-RS on the first resource; and
   transmitting, to the base station, a Sounding Reference Signal (SRS) on an SRS resource associated with the first resource, based on reception of the CSI-RS.

2. The method of claim 1, wherein information related to a beam for transmission of the SRS is determined by the UE.

3. The method of claim 1, wherein the SRS resource is a frequency domain resource configured by an SRS resource configuration.

4. The method of claim 1, further comprising:
selecting, by the UE using the configuration information, a configuration of the SRS based on a detected beam of the CSI-RS.

5. The method of claim 1, wherein the configuration information indicates a number of ports for the CSI-RS.

6. The method of claim 1, wherein the configuration information indicates a density of the CSI-RS.

7. The method of claim 1, wherein the SRS resource is specified, by the configuration information, to be within an SRS transmission band.

8. A method performed by a base station, the method comprising:
transmitting, to a User Equipment (UE), configuration information configuring a first resource for a CSI-RS (Channel State Information Reference Signal),
wherein,
the first resource comprises one or more resource elements allocated for the CSI-RS,
the first resource is within a first partial frequency band, and
the first partial frequency band is configured within a downlink frequency region where a Physical Downlink Shared Channel (PDSCH) is transmitted;
transmitting, to the UE, the CSI-RS on the first resource; and
receiving, from the UE, a Sounding Reference Signal (SRS) on an SRS resource associated with the first resource, wherein the SRS is received based on transmission of the CSI-RS.

9. The method of claim 8, wherein information related to a beam for transmission of the SRS is determined by the UE.

10. The method of claim 8, wherein the SRS resource is a frequency domain resource configured by an SRS resource configuration.

11. The method of claim 8, further comprising:
transmitting an RS configuration to the UE, wherein a configuration of the SRS is selected based on the RS configuration and a beam of the CSI-RS detected at the UE.

12. The method of claim 8, wherein the configuration information indicates a number of ports for the CSI-RS.

13. The method of claim 8, wherein the configuration information indicates a density of the CSI-RS.

14. A User Equipment (UE) comprising:
a memory storing instructions; and
a processor configured to execute the instructions to:
receive, from a base station, configuration information configuring a first resource for thea CSI-RS (Channel State Information Reference Signal),
wherein,
the first resource comprises one or more resource elements allocated for the CSI-RS,
the first resource is within a first partial frequency band, and
the first partial frequency band is configured within a downlink frequency region where a Physical Downlink Shared Channel (PDSCH) is received;
receive, from the base station, the CSI-RS on the first resource; and
transmit, to the base station, a Sounding Reference Signal (SRS) on an SRS resource associated with the first resource, based on reception of the CSI-RS.

15. The UE of claim 14, wherein the processor is further configured to execute the instructions to determine information related to a beam for transmission of the SRS.

16. The UE of claim 14, wherein the SRS resource is a frequency domain resource configured by an SRS resource configuration.

17. The UE of claim 14, wherein the processor is further configured to execute the instructions to:
select, using an RS configuration received from a base station, a configuration of the SRS based on a detected beam of the CSI-RS.

18. The UE of claim 14, wherein the configuration information indicates a number of ports for the CSI-RS.

19. The UE of claim 14, wherein the configuration information indicates a density of the CSI-RS.

* * * * *